(12) United States Patent
Rajaraman et al.

(10) Patent No.: US 8,874,640 B2
(45) Date of Patent: Oct. 28, 2014

(54) METHOD AND SYSTEM FOR REDUCING SERVICE OVERHEAD IN SERVICE ORIENTED ARCHITECTURES

(75) Inventors: Prasanna Rajaraman, Tamil Nadu (IN); Sethuraman Ramasundaram, Tamil Nadu (IN)

(73) Assignee: Infosys Limited, Bangalore, Karnataka (IN)

( * ) Notice: Subject to any disclaimer, the term of this patent is extended or adjusted under 35 U.S.C. 154(b) by 301 days.

(21) Appl. No.: 13/073,312

(22) Filed: Mar. 28, 2011

(65) Prior Publication Data

US 2012/0226737 A1 Sep. 6, 2012

(30) Foreign Application Priority Data

Mar. 1, 2011 (IN) .............................. 598/CHE/2011

(51) Int. Cl.
 G06F 15/16 (2006.01)
 G06F 9/44 (2006.01)
 G06F 9/445 (2006.01)
 G06F 9/50 (2006.01)

(52) U.S. Cl.
 CPC .......... *G06F 9/44526* (2013.01); *G06F 9/5044* (2013.01)
 USPC ......................................... 709/203; 717/126

(58) Field of Classification Search
 USPC ......................................................... 709/203
 See application file for complete search history.

(56) References Cited

U.S. PATENT DOCUMENTS

| | | | | |
|---|---|---|---|---|
| 5,758,077 A | * | 5/1998 | Danahy et al. ................. | 709/201 |
| 7,127,492 B1 | * | 10/2006 | Calo et al. ..................... | 709/214 |
| 7,716,492 B1 | * | 5/2010 | Saulpaugh et al. ........... | 713/185 |
| 7,802,264 B2 | * | 9/2010 | Robertson et al. ............ | 709/215 |
| 2003/0033369 A1 | * | 2/2003 | Bernhard ....................... | 709/203 |
| 2003/0154265 A1 | * | 8/2003 | Raffaele et al. ............... | 709/221 |
| 2005/0203962 A1 | * | 9/2005 | Zhou et al. ..................... | 707/200 |
| 2005/0246726 A1 | * | 11/2005 | Labrou et al. .................. | 719/328 |
| 2006/0036463 A1 | * | 2/2006 | Patrick et al. ...................... | 705/1 |
| 2007/0283317 A1 | * | 12/2007 | Sadler et al. ................... | 717/103 |
| 2008/0244715 A1 | * | 10/2008 | Pedone .............................. | 726/5 |
| 2009/0287477 A1 | * | 11/2009 | Maes et al. ..................... | 704/201 |
| 2010/0153492 A1 | * | 6/2010 | Brunswig et al. ............. | 709/203 |
| 2010/0241694 A1 | * | 9/2010 | Jensen et al. .................. | 709/203 |
| 2010/0332677 A1 | * | 12/2010 | Tian .............................. | 709/233 |
| 2011/0023053 A1 | * | 1/2011 | Gathman et al. .............. | 719/320 |
| 2011/0145795 A1 | * | 6/2011 | Khanapurkar et al. ........ | 717/126 |
| 2011/0302239 A1 | * | 12/2011 | Grateau et al. ................ | 709/203 |

* cited by examiner

*Primary Examiner* — Hamza Algibhah
*Assistant Examiner* — James Edwards
(74) *Attorney, Agent, or Firm* — Michael Best & Friedrich LLP (57) ABSTRACT

A system and method for processing service request in service oriented architectures to minimize service overhead is provided. The method includes invoking a software service by a client by sending service request to a server hosting the software service. The method further includes receiving the software service request by the server and determining whether one or more portions of service logic software code should be executed by the client, based on information related to client capabilities. Thereafter, service logic software code is streamed to the client partly or in-total. The client executes service logic software code provided by the server. The server is pre-configured to execute or transfer one or more portions of service logic software code to the client based on client capability information and extent of affinity of the service for server-specific resources. The server executes the software service partly or in-total based on the configuration.

29 Claims, 5 Drawing Sheets

METHOD AND SYSTEM FOR REDUCING SERVICE OVERHEAD IN SERVICE ORIENTED ARCHITECTURES

FIELD OF INVENTION

The present invention relates generally to the field of service oriented architectures. More particularly, the present invention enables dynamic transfer of service logic across system and process boundaries in order to improve performance of software services.

BACKGROUND OF THE INVENTION

Service-oriented architecture (SOA) is a specific implementation of software architecture wherein one or more services are configured to be inter-operable and reusable within diverse software platforms and applications. Typically, in an SOA implementation, business processes are deployed within and across organizations as inter-operable services which can be used by applications without warranting any knowledge of service logic implementation. A characteristic of a software service in an SOA is use of the concept of "loose coupling" wherein the software service functionality is decoupled from a requesting application or service.

For implementation of business activities in SOA architecture, coordination of two or more services may be required. The coordination of services is achieved by employing means to connect the services with each other, such as by using Web Services. Since Web Services use standard protocols that are independent of platforms and programming languages, the protocols are used to describe service logic and to pass messages between applications. However, the decoupling of software service functionality carries a performance cost due to network and runtime service overhead. Whenever a client application requires the use of a service, it does so by sending a request message to a server hosting the service "over the wire" and the requested service is executed remotely at the server. In the case where frequently occurring transactions are implemented as services, system performance may be sufficiently degraded due to frequent service requests and executions. An example of a frequently occurring transaction may be identification of type of credit or debit card used during processing of point-of-sale transactions which requires a lookup on a Bank Identification Number (BIN) file.

The basic goal of an SOA is to minimize duplication of commonly used logic in multiple applications by implementing the logic as a reusable service. However, an SOA should be designed so as to minimize number of service requests by client applications in order to reduce service performance deterioration. Further, during architecting and implementing SOA architectures, issues of latency and service overhead need to be addressed with an attempt to minimize them.

SUMMARY OF THE INVENTION

A system, method and computer program product for processing service requests in a service oriented architecture is provided. The system and method of the present invention facilitates reduction of service overhead. The method includes invoking a software service by a client, wherein the software service is invoked by sending a service request to a server hosting the software service. The software service request is received by the server and it is determined whether the software service should be executed by the client. The determination is made by ascertaining whether the software service is enabled for client-side execution and is capable of being executed by the client. The method further includes providing service logic software code to the client for processing the service request, if it is determined that the software service is enabled for client-side execution and is capable of being executed by the client. In an embodiment of the present invention, the software service is executed by the client upon receipt of service logic software code from the server. In another embodiment of the present invention, the requested software service is executed by the server if it is determined that the software service is not enabled for client-side execution or is not capable of being executed by the client.

In an embodiment of the present invention, following the receipt of service logic software code, subsequent requests for the software service are executed by the client. The client regularly receives updates of the service logic software code from the server.

In an embodiment of the present invention, the service logic software code is streamed to the client by a service container application at the server hosting the code.

In various embodiments of the present invention, the service logic software code is deployed within the service container application in a programming language mutually supported by the client and the server. In another embodiment of the present invention, the service logic software code is deployed within the service container application in a programming language that can be executed in a plurality of software platforms.

In an embodiment of the present invention, the software service is enabled for being executed by the client partly or in-total based on the extent of affinity the service has for server-specific resources, wherein the enablement is configured at the server by a system administrator.

In an embodiment of the present invention, the software service is enabled for being executed by the client partly or in-total based on information about client capabilities, wherein the enablement is automatically configured by the server.

In various embodiments of the present invention, the service logic software code includes one or more portions of the entire software code required for executing the service, wherein the one or more portions are developed and deployed within the service container application based on information about client capabilities.

In an embodiment of the present invention, determining whether the software service is capable of being executed by the client comprises determining whether the client has the necessary resources and libraries for executing the service logic software code and determining whether runtime execution of service logic software code is supported by the client.

In an embodiment of the present invention, determination regarding client capability for service execution is made by the server upon receiving client-capability information from the client as part of software handshake process.

In an embodiment of the present invention, the service logic software code is executed by the client using a software plug-in. In another embodiment of the present invention, the service logic software code is executed by the client using a sandbox. In yet another embodiment of the present invention, the service logic software code is executed by an intermediate infrastructure such as a proxy server.

In an embodiment of the present invention, the system for processing a service request includes a client system including an XML marshaller configured to receive a service request and further configured to convert request objects into XML-formatted data. The client system further includes a SOAP/Service Logic Binding component configured to encapsulate XML-formatted data within a SOAP message and further configured to define rules for binding the SOAP message to a service request message. A Service Logic Invoker is configured to send the service request message to at least one of a server and a client container application based on determining whether the service can be executed at the client system. Further, a client container application configured to download service logic software code streamed from the server and further configured to execute the code in order to process the service request.

In various embodiments of the present invention, a server is configured to stream service logic software code to the client system. The server includes a service platform configured to host service logic software code corresponding to complete execution of service request, wherein the service logic software code is deployed at the service platform by a developer. The server further includes a service container application configured to host one or more portions of service logic software code that are client-compatible, wherein the client-compatible code corresponds to partial execution of the service request, further wherein the service container application is further configured to determine portions of service logic software code that are client-compatible.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

In an SOA, software applications are implemented as software services, published over a computer network, such as the Internet, and accessed by client applications. Typically, SOA services are executed at server-side which results in service access overhead which in turn eventually leads to service performance degradation. Examples of service access overhead include network latency and other service/protocol related overheads. The performance degradation is considerable in the case of frequently accessed applications. Exemplary embodiments of the method and system of the present invention provide a virtualization software framework layer that easily integrates with traditional SOA infrastructure and facilitates SOA services to run locally in-part or totally local to client (consumer) applications. This is achieved by enabling dynamic transfer of service logic software code across server and client platforms. Dynamic Transfer of software code is largely unconstrained by software platform limitations, the only limitations being resource affinity on the server side and client-side limitations.

The present invention would now be discussed in context of embodiments as illustrated in the accompanying drawings.

Figure 1:
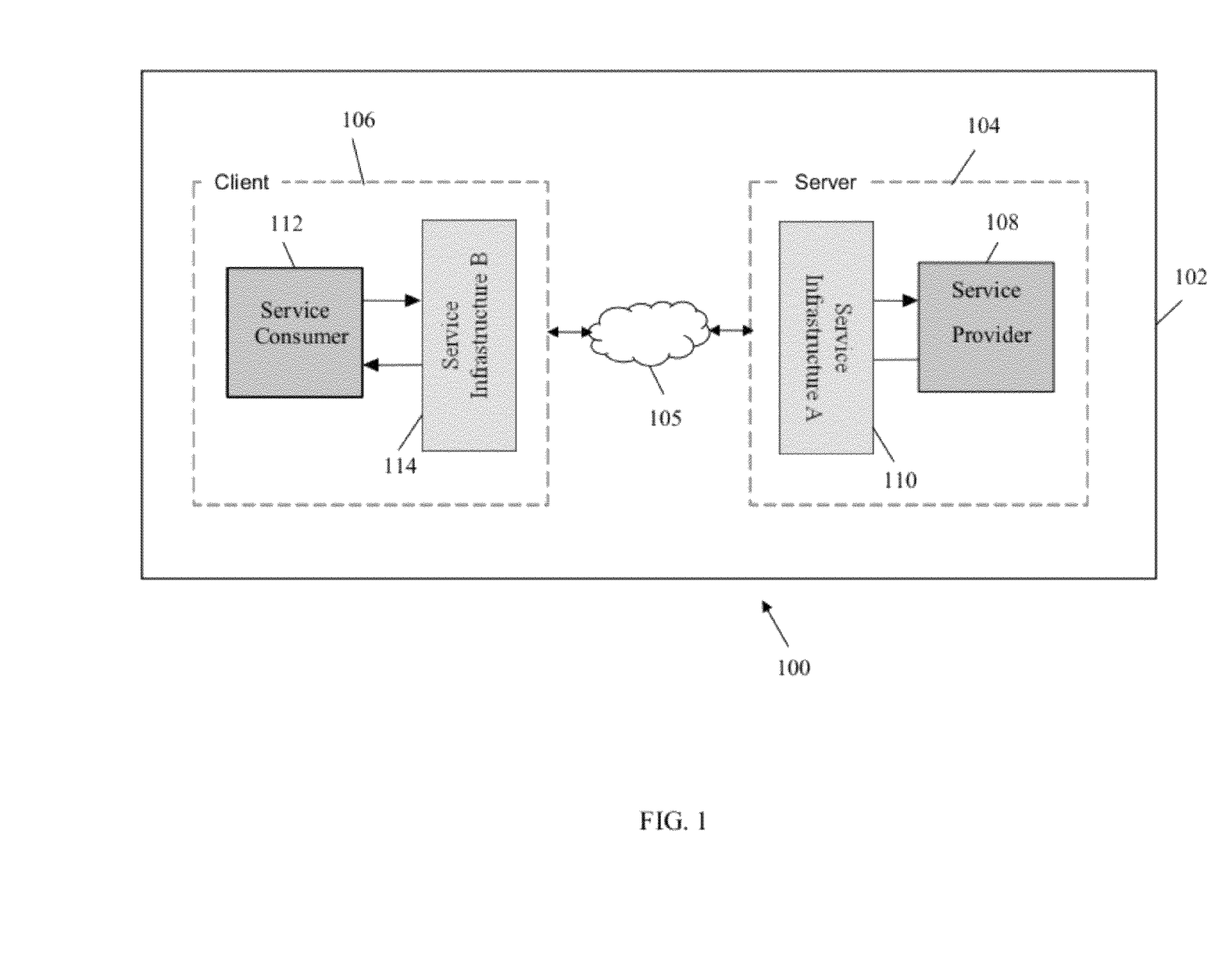
FIG. 1 is a schematic diagram illustrating interaction between a server hosting software services and a client application in an SOA.

FIG. 1 is a schematic diagram illustrating interaction between a server hosting software services and a client application in an SOA 102. An SOA is a software architecture wherein software services are published or broadcasted over a computer network, such as the Internet. Various applications that are connected to the network use the software services by requesting those using standard protocols. Applications in an SOA may be built using a standard software framework that supports distributed computing and is configured to provide Application Programming Interfaces which can be used by clients and servers to communicate with each other. Within SOA 102, Server 104 and Client 106 communicate with each other through Network 105. Network 105 may be a Local Area Network (LAN), a Wide Area Network (WAN), a Metropolitan Area Network (MAN), the Internet and the like. Within Server 104, fundamental software modules for execution of SOA services include a service provider application 108 and Service Infrastructure A 110. Similarly, within Client 106, software modules that are involved for availing a software service include a service consumer application 112 and Service Infrastructure B 114.

Service provider 108 is responsible for creating one or more software services required by one or more clients and publishing its interface information to a service registry. The interface information may include location information (such as network addresses) of services within Service provider 108 so that client programs can access the services, when required. In a case where web services are used to implement SOA services, the interface information may be contained within a Web Services Description Language (WSDL) file published in a service registry by a service provider. The service registry is accessible to client applications and clients may be able to locate service details in the registry using a protocol such as Universal Description, Discovery and Integration (UDDI). Software services offered by Service provider 108 may be consumed by Service consumer 112 via Client 106.

Service Infrastructure A 110 and Service Infrastructure B 114 within Server 104 and Client 106 respectively are configured to provide functionality to ensure proper execution of SOA services. Significant software modules hosted within Service Infrastructure A 110 and Service Infrastructure B 114 may include, but are not limited to, a service bus, a messaging module, a business process management module, an event processing module, a data interoperability module, an event processing module, a mainframe integration module etc.

SOA 102 is designed such that modules operating within Service Infrastructure A 110 and Service Infrastructure B 114 only need to execute their specific functions and are not required to be aware of other service details and client specific details. For example, a service bus carries out the functions of data transformation and routing and is agnostic about implementation aspects of service consumer 112. Further, modules within Service Infrastructure A 110 and Service Infrastructure B 114 do not take into consideration specifics such that whether Service consumer 112 is a thin client or a thick client, when executing functions such as message passing, event execution etc. Since infrastructural requirements vary based on type of client, this leads to a sub-optimal utilization of resources across components involved in service interaction.

Figure 2:
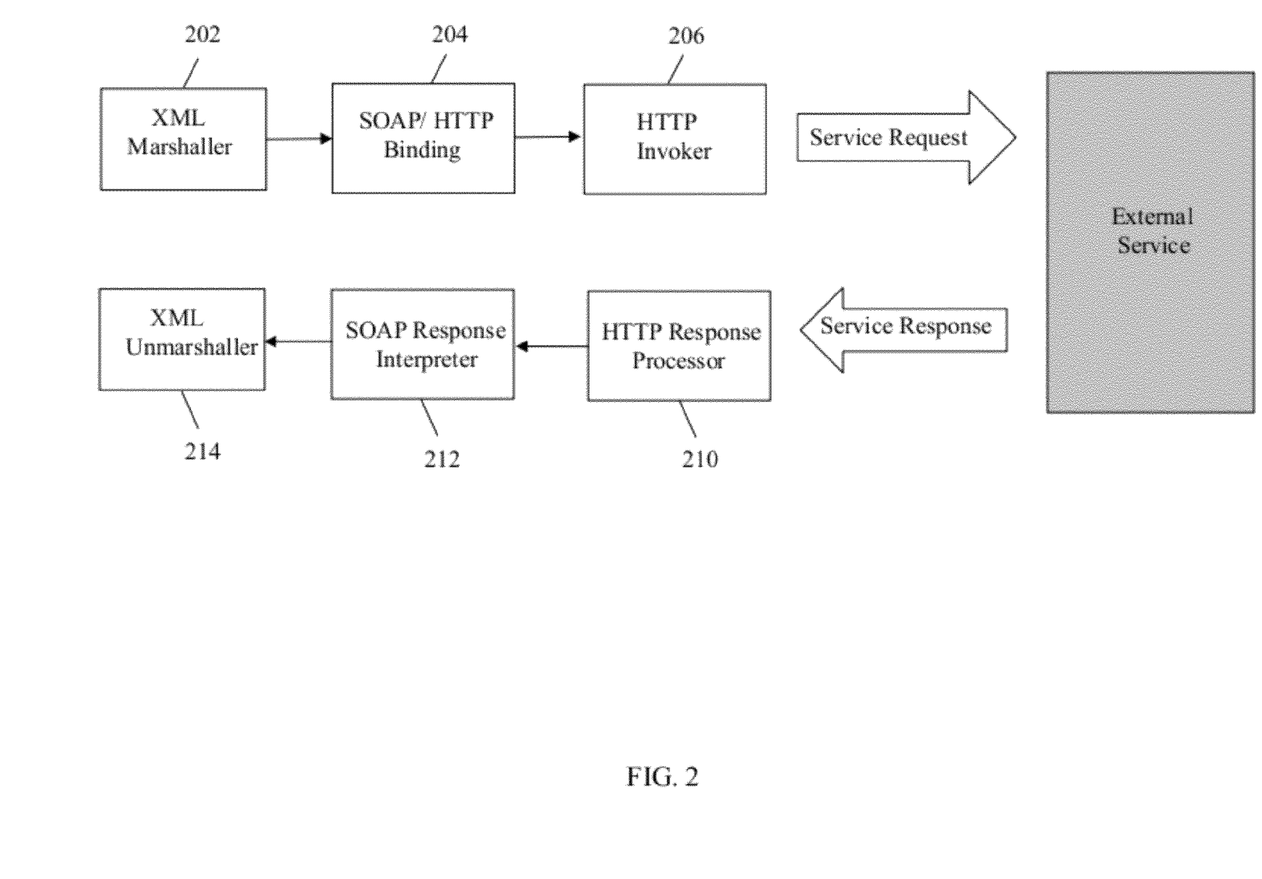
FIG. 2 is a schematic diagram illustrating detailed set of components and their interactions in servicing a web service request in an SOA.

FIG. 2 is a schematic diagram illustrating detailed set of components and their interactions in servicing a web service request in an SOA. Web services are software applications available over the Internet and are accessible using standard messaging systems. A messaging system allows separate uncoupled applications to reliably communicate asynchronously. A commonly used standard messaging system for publishing and accessing web services is Extensible Markup Language (XML)-based messaging system. An XML-based messaging system conforms to standards such as WSDL, SOAP, UDDI and HTTP. WSDL is an XML-based language used for describing web services and also specifies attributes for accessing web services. Simple Object Access Protocol (SOAP) is an XML-based messaging framework which is extensible and is independent of programming models, whereas UDDI is an internet registry where web service applications are registered and accessed using SOAP messages.

For accessing a web service, a client application marshals the request using XML marshaller 202. XML marshaller 202 converts request objects into XML-formatted data. XML data is then encapsulated within a SOAP message and is forwarded to a server hosting the required web service. Since the SOAP message is transmitted over the Internet, the underlying transport protocol used for transmitting the message is Hypertext Transfer Protocol (HTTP). Firstly, a SOAP/HTTP binding component 204 defines rules for binding the SOAP message to the HTTP header. The binding details specified include details related to content-type, content-length, desired action, SOAP processor identification, message intent etc. The actual message is then encapsulated as body of the HTTP message and HTTP invoker 206 makes the service request in HTTP protocol format.

Upon receiving the service response, HTTP response processor 210 processes the response and delivers the SOAP message to SOAP response interpreter 212. SOAP response interpreter 212 extracts XML-formatted data from the SOAP message and delivers it to XML Unmarshaller 214. XML Unmarshaller then extracts the response object from the XML-formatted data.

Figure 3:
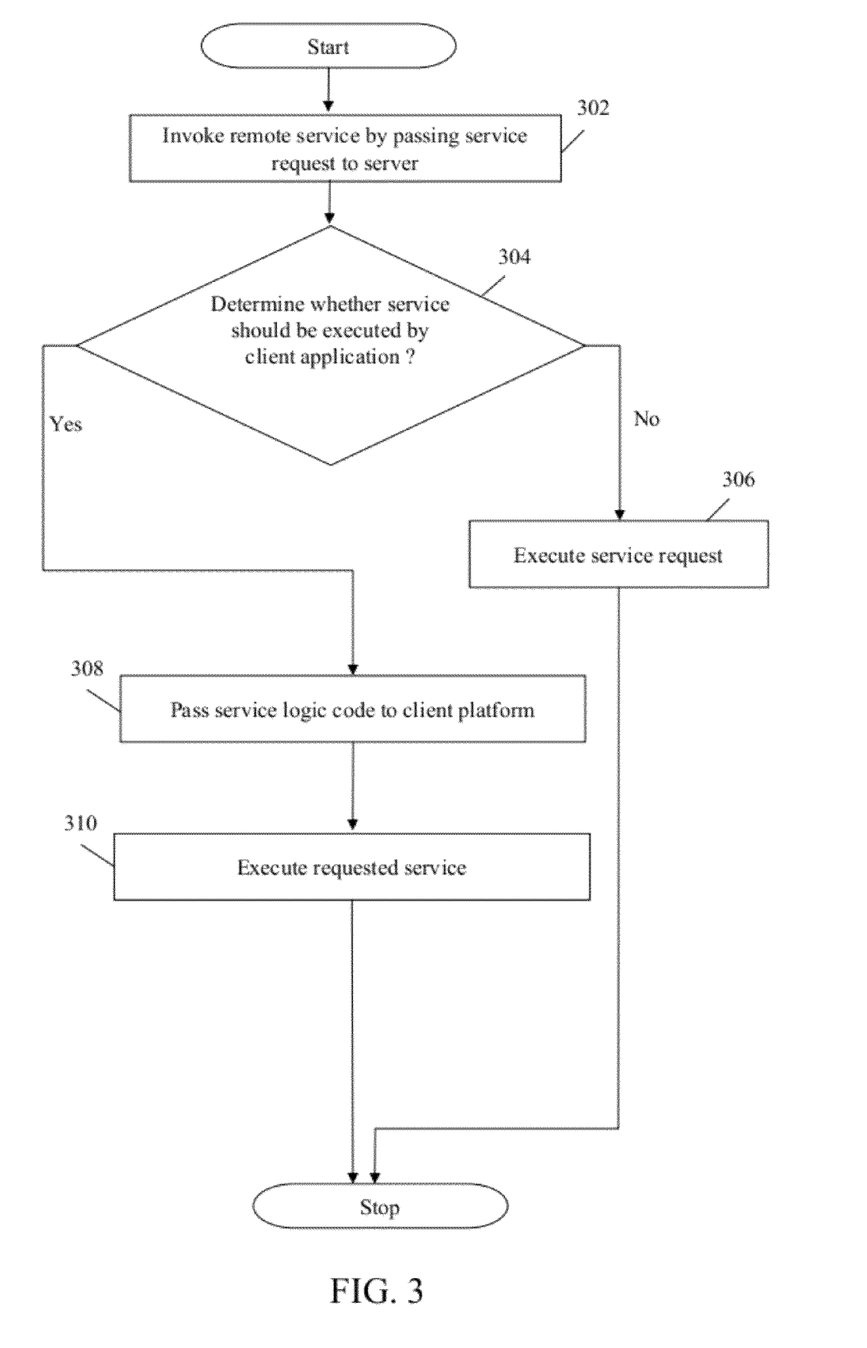
FIG. 3 is a flowchart illustrating method steps for enabling dynamic transfer of service logic software code across system and process boundaries in order to execute software services, in accordance with an embodiment of the present invention.

FIG. 3 is a flowchart illustrating method steps for enabling dynamic transfer of service logic software code across system and process boundaries in order to execute software services, in accordance with an embodiment of the present invention. SOA services published over a computer network are traced and accessed by client systems connected to the network. At step 302, a required software service is invoked by a client (service consumer) application hosted on a client platform. In an embodiment of the present invention, a software service may be an application for calculation of insurance premium that may be requested by a financial application. A required service is invoked by sending a service request to a server by the client application. A requested service may be a web service in the form of an HTTP request. Once a service container application on the server receives the service request, at step 304, it determines whether the service should be executed by the client or by itself. For determining whether the service should be executed by the client, it is ascertained whether the service is capable of being executed by the client. For determining whether the service is capable of being executed by the client, the following criteria is considered by the service container application:

1. The first criterion is, whether the particular service is enabled for being executed at client-side. In an embodiment of the present invention, a developer/system can enable a specific service (in total or in-part) for being executed at client-side based on the extent of affinity the particular service has for server-specific resources. The enablement can be pre-configured by a system administrator or may be decided automatically by the server based on the dependency the service has on server resources.
2. Secondly, it is determined whether the client is resource-enabled for executing the particular service. For example, the client should have the necessary libraries and/or resources to execute a service logic software code. In an exemplary embodiment of the present invention, a thin client may not have the resources for executing the service logic software code. In such a scenario, the service is a regular SOA service executed at the server-side. In an embodiment of the present invention, the client provides information about its capabilities to the service container application as part of a software handshake.
3. The third criterion used by the service container application to determine whether the service is client-side executable is if runtime execution of service logic code is supported by the client. For example, a client may not be .NET compatible but may support execution of .NET software code through plug-ins. This information is also provided to the service container application by the client as part of the handshake process.

Further, for determining whether the service is capable of being executed by the client, the service container application determines whether additional requirements conforming to service security and validity (duration) of service are met by the client application. In an exemplary embodiment of the present invention, the service container application determines whether standard methodologies used for handling the requirements are implemented by the client application. An example of a methodology for conforming to service validity requirement may include use of response header to indicate how long the service code is valid. This is to avoid an older version of the service code from being cached and executed on the client side. A critical security requirement is to conform whether the level of trust between the service provider and the consumer is sufficient to determine if the service logic software code can be exchanged between the server and the client application. In various embodiments of the present invention, the service container application may conform that communication between the server and the client application is realized using a secure protocol such as Secure Sockets Layer (SSL) protocol.

In addition to above mentioned criteria of service security, validity and client capability, other criteria to be considered are service latency and network availability. In an exemplary embodiment of the present invention, the service container application estimates total system load before deciding whether the service request is to be executed locally. In various embodiments of the present invention, the client application may be running in a resource constrained environment and it may not be feasible for the client application to execute the service. Hence, if it is determined that the service is not capable of being executed by the client application, at step 306, the service request is executed by the server. However, if it is determined that the service is capable of being executed by the client application, at step 308 service logic software code is provided to the client (service consumer) platform by the service container application. In an embodiment of the present invention, the service logic software code is an executable code streamed by the server to the client platform.

In an embodiment of the present invention, for achieving interoperability, the service logic software code is realized using a programming language that can be executed in multiple software platforms. An example of a programming language in which it is implemented is an ECMAScript. In another embodiment of the present invention, the server is configured to stream the service logic software code in a programming language mutually supported by the server and the client. The programming language for streaming the code can be decided by the service container application based on information about client capabilities exchanged during handshake. In yet another embodiment of the present invention, a plug-in approach is used by the client container application for supporting heterogeneous environments. For example, if the client platform is Java-based and the requested service is a .NET component, the client container application can use .NET plug-in to execute the service.

The client platform comprises a client container application that stores the service logic software code. In an embodiment of the present invention, the client container application implements a sandbox for executing the code which is isolated from other client applications. An example of a sandbox may be a Java Virtual Machine (JVM) container. Another example of a sandbox may be a .NET container. However, as illustrated by the aforementioned embodiments, if the server and client are in a mutually compatible technology or in case the client supports service execution through a plug-in, no separate implementation is required for the service execution to be enabled.

Subsequently, at step 310, a client application within the client container application executes the service locally. After executing a particular service, all subsequent requests for the service are locally handled by the client container application. The client container application regularly communicates with the service container application for receiving updates of service logic software code corresponding to one or more requested services.

In various embodiments of the present invention, middleware such as a proxy server can be involved in service execution by downloading service logic software code from the server and executing the service. The execution of service by the proxy server is transparent to the client platform. However, the proxy server can also relay the service logic software code to the client container application for executing the service. For every service invocation, the service logic software code may be executed either at server, intermediate infrastructure like proxy server or at the client system depending on whichever execution is optimal. In an embodiment of the present invention, if the client is resource constrained it can request service execution on the server. However, an intermediate infrastructure such as the proxy server can choose to execute the service in lieu of the server so that service load is dynamically shared between systems participating in SOA-based applications.

Figure 4:
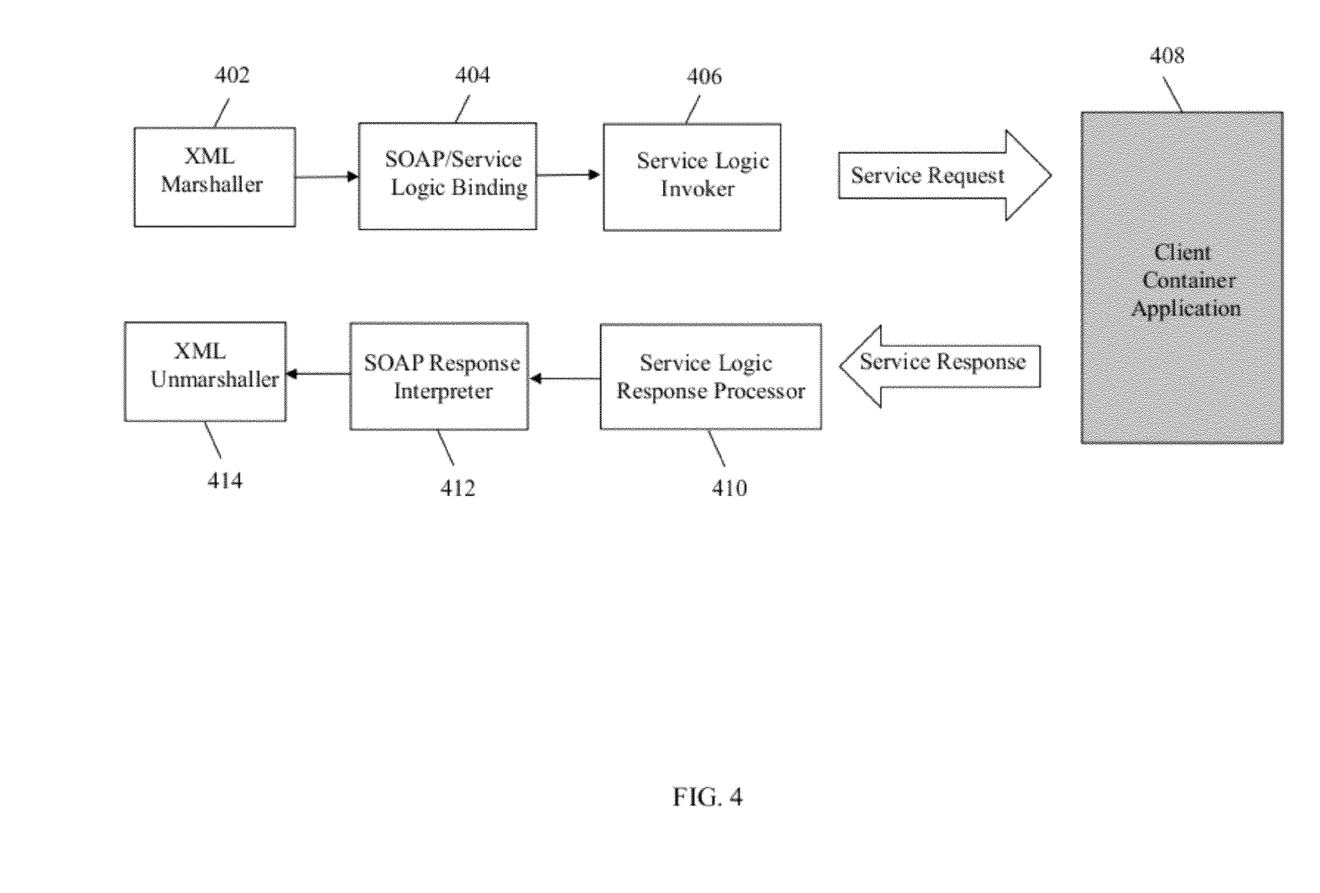
FIG. 4 is a schematic diagram illustrating detailed set of components involved from a client perspective in servicing a request, in accordance with an embodiment of the present invention.

FIG. 4 is a schematic diagram 400 illustrating detailed set of components involved from a client perspective in servicing a request. In accordance with various embodiments of the present invention, a client platform is configured to execute one or more services locally based on interactions with a service platform, wherein executable software codes corresponding to the one or more services are received and stored by a client container application. However, in some embodiments of the present invention, a client platform may not have executable software codes for servicing requests. In either case, the set of components illustrated in FIG. 4 interoperate to invoke and/or execute a service request. For requesting a software service, a client application marshals the request using XML marshaller 402. XML marshaller 402 converts objects associated with the service request into XML-formatted data. XML data is then encapsulated within a SOAP message and sent to client container application 408. Alternately, if the client container application is unable to service the request, the SOAP message is sent to a server as part of a service call. In order to transmit the SOAP message a SOAP/Service Logic Binding component 404 defines rules for binding the SOAP message to a request message. In an embodiment of the present invention, SOAP/Service Logic Binding component 404 may add custom headers to manage service logic software code exchange with a server in a manner transparent to the client application (service consumer).

The actual message is then encapsulated as body of request message and is used by Service Logic Invoker 406 for making the service request. Service Logic Invoker 406 makes the service request either to the client container application 408 or to the server based on the following conditions: Firstly, Service Logic Invoker 406 determines whether the service is enabled for being executed at client-side. In an embodiment of the present invention, if the service is not enabled for client-side execution, Service Logic Invoker 406 makes a service request to a remote server. Secondly, the Service Logic Invoker 406 determines whether the service logic software code is downloadable. If it is determined that the service logic software code is not downloadable, in this case also service execution request is made to the server. However, if it is determined that the service is enabled but not yet downloaded, Service Logic Invoker 406 can initiate download of the code for client-side execution by the client container application 408.

In an embodiment of the present invention, if it has been determined by the Service Logic Invoker 406 that the client container application 408 has the service logic software code for executing a service, a request for service execution is issued to the client container application 408. Upon receiving the service execution request, the client container application 408 performs the service execution.

Upon receiving the service response, Service Logic response processor 210 processes the response and delivers the SOAP message to SOAP response interpreter 412. SOAP response interpreter 412 extracts XML-formatted data from the SOAP message and delivers it to XML Unmarshaller 414. XML unmarshaller then extracts the response object from the XML-formatted data.

Figure 5:
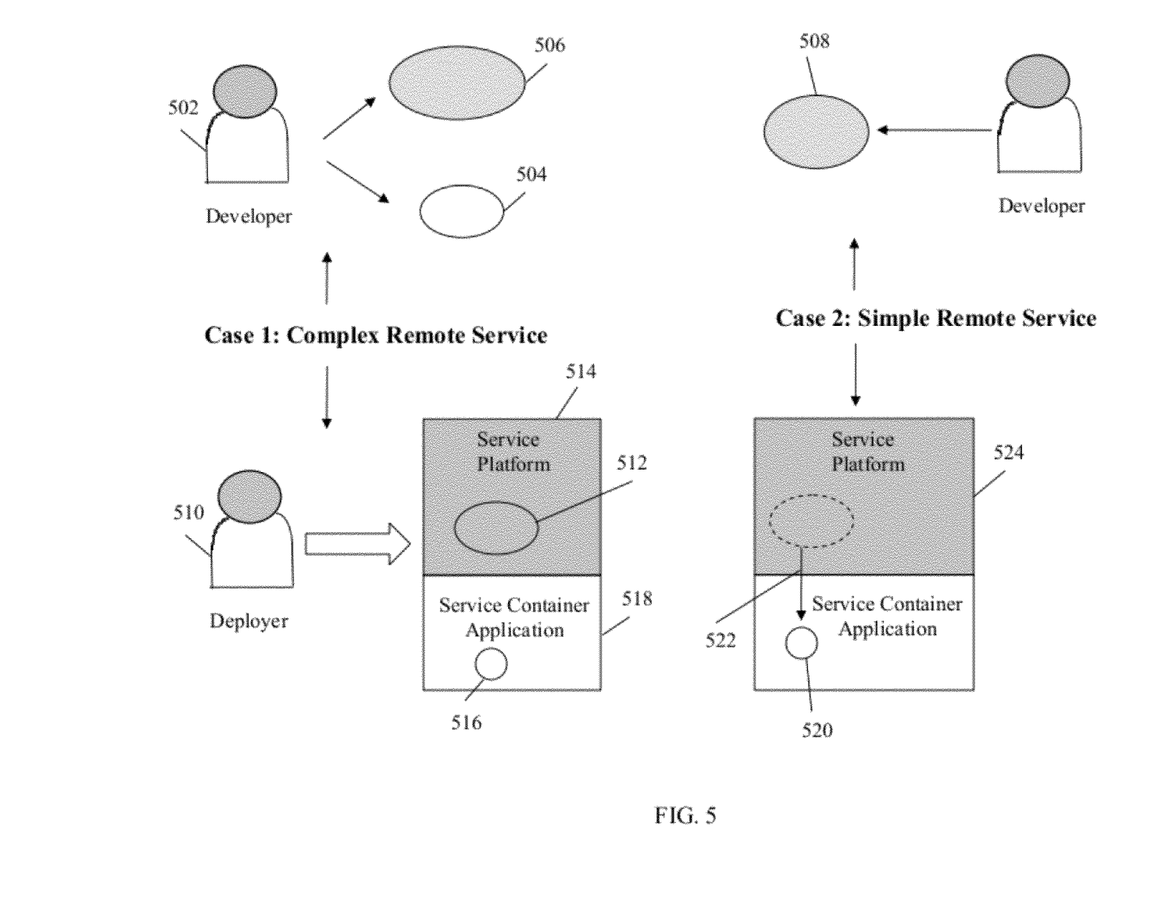
FIG. 5 is a diagram illustrating development and deployment of service logic software code in a server platform for various types of services, in accordance with an embodiment of the present invention.

FIG. 5 is a diagram illustrating development and deployment of service logic software code in a server platform for various types of services, in accordance with an embodiment of the present invention. For implementing system and method of the present invention, a consideration of use cases and operations corresponding to one or more services is done. Service requirements can be categorized as one of the following types: A simple service with minimal input-output operations or a complex service with multiple use cases and extensive input-output operations. In various embodiments of the present invention, a simple service with minimal input-output operations may be capable of being executed by a client platform, whereas a complex service may not be entirely executed within the client platform. A complex remote service illustrated by Case 1 in the figure comprises multiple use cases and extensive input-output operations. In Case 1, a developer 502 demarcates part of service that can be streamed to the client platform. Further, service logic software code corresponding to this part of service is implemented in a platform compatible with target client environment. The client-compatible software code 504 includes simple use cases with minimal input-output implementation. In an embodiment of the present invention, the client-compatible software code 504 may be developed in a platform agnostic technology (Eg. ECMAScript). In an embodiment of the present invention, in addition to developing client-compatible software code corresponding to simple use cases, software code corresponding to all use-cases associated with the complex service is stored separately. The complete service implementation 506 need not be compatible with the client environment. However, in various embodiments of the present invention, if the server and the client are implemented using mutually compatible software platforms or if the client supports service implementation of the complex service through a plug-in, no separate service implementation is required.

A simple remote service having simple use-cases and minimal input-output operations, as illustrated by Case 2, can be entirely implemented using a singular software code implementation 508. Software code 508 can be entirely streamed to a client platform so that it can be executed locally.

During deployment of software code corresponding to a service, a deployer 510 makes a decision regarding portions of code to be enabled for this invention. In an embodiment of the present invention, in case of a complex service, the deployer deploys software code corresponding to complete service implementation 512 at the service platform 514 and code corresponding to the client-compatible portion 516 within a service container application 518. An interface is provided to the service container application 518 so that client-compatible code can be easily streamed to a client platform, when requested. For a complex service request, at runtime, the service container application 518 first examines the request and determines whether the client platform supports execution of software code corresponding to service. In certain scenarios, the client platform may support execution of software code but may not be capable of executing complex use-cases. In such a case, the service container application 518 intimates this information to the client platform. The client platform thereby requests the service to be executed by the service platform 514, which in turn executes the complete service implementation 512.

In another embodiment of the present invention, in case of a simple service with minimal input-output operations, the deployer deploys software code 520 corresponding to complete implementation (all use-cases) of the simple service as client-compatible. Further, a reference 522 is added at the service platform 524 specifying that all service requests are to be handled by streaming the client-compatible code 520 to the client platform. At runtime, the client-compatible code 520 is streamed to a requesting client to be executed locally. For the purposes of this invention, the term client could be an actual service consumer or an intermediate infrastructure, such as a proxy server. Additionally, in case a remote execution of the simple service is requested, the remote execution is also handled by a local instance of the client-compatible code 520 at the service platform 524. A copy of implementation of the client-compatible code 520 is sent to the requesting client by the service platform 524.

The system and method of the present invention facilitates abstraction of service logic from underlying software platforms. The implementation of system and method of the present invention is not bound to any system, process or platform. Further, since execution of method of the present invention is transparent to client platforms, it can be leveraged to enable distribution of processing load across computing infrastructure. Typically, the preferred platforms for requesting web services are .NET and J2EE. These platforms use managed execution of code where the web container is both aware of and controls runtime characteristics and dependencies of a requested service. In various embodiments of the present invention, the system can be integrated with the container so that the process of deciding which services are capable of being streamed to clients can be automated. This removes manual involvement required during development and deployment of service logic software code.

The method and system for reducing service overhead in service oriented architectures as described in the present invention or any of the embodiments, may be realized in the form of a computer system. Typical examples of a computer system include a general-purpose computer, a programmed microprocessor, a micro-controller, a peripheral integrated circuit element, and other devices or arrangement of devices that are capable of implementing the steps that constitute the method of the present invention.

The computer system typically comprises a computer, an input device, and a display unit. The computer typically comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions on the computer system.

The computer system executes a set of instructions that are stored in one or more storage elements to process input data. The storage elements may also hold data or other information, as desired, and may be an information source or physical memory element present in the processing machine. The set of instructions may include various commands that instruct the processing machine to execute specific tasks such as the steps constituting the method of the present invention.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for processing one or more service requests for reducing service overhead in a service oriented architecture comprising one or more clients, one or more intermediate infrastructures, and one or more servers, the method comprising:

invoking a software service by a client, wherein the software service is invoked by sending a service request to a server hosting the software service;

receiving the service request by the server;

determining whether the software service is enabled for client-side execution and is capable of being processed by the client by estimating total system load including that of the client;

streaming service logic software code from the server to the client for enabling the client to process the service request upon ascertaining that the software service is enabled for client-side execution and is capable of being processed by the client, wherein the service logic software code is streamed to the client by a service container application and is downloaded by a client container application, and wherein the service container application is configured: to estimate the total system load including that of the client, to indicate a validity period of the service logic software code using a response header, and to execute the service logic code if the service logic code is in the validity period;

allowing processing of the requested software service by the client, if the service logic software code is streamed from the server to the client; and allowing processing of the requested software service by the server, if it is determined that the software service is not enabled for client-side execution or is not capable of being executed by the client; and allowing processing of the requested software service by an intermediate infrastructure, wherein the intermediate infrastructure downloads the service logic software code from the server for processing the requested software service in lieu of the server to share the load on the server.

2. The method of claim 1 further comprising following the receipt of service logic software code, executing subsequent service requests for the software service by the client.

3. The method of claim 2 further comprising receiving updates of the service logic software code at regular intervals by the client.

4. The method of claim 1, wherein the service logic software code is deployed within the service container application in a programming language mutually supported by the client and the server.

5. The method of claim 1, wherein the service logic software code is deployed within the service container application in a programming language that can be executed in a plurality of software platforms.

6. The method of claim 5, wherein the programming language is an ECMAScript.

7. The method of claim 5, wherein the programming language is a standardized programming language supported across multiple software platforms.

8. The method of claim 1, wherein the software service is enabled for being executed by the client partly or in-total based on the extent of affinity the service has for server-specific resources, further wherein the enablement is implemented by at least one of configuration by a system administrator at the server and automatic configuration at the server.

9. The method of claim 8, wherein the service logic software code includes one or more portions of the entire software code required for executing the service, wherein the one or more portions are developed and deployed within the service container application based on information about client capabilities.

10. The method of claim 8, wherein the software service is executed by the server partly or in-total based on the configuration at the server.

11. The method of claim 1, wherein the software service is enabled for being executed by the client partly or in-total based on information about client capabilities, further wherein the enablement is automatically configured by the server.

12. The method of claim 11, wherein determining whether the software service is capable of being executed by the client comprises:

determining whether the client has the necessary resources and libraries for executing the service logic software code; and determining whether runtime execution of service logic software code is supported by the client.

13. The method of claim 11, wherein the determination regarding client capability for service execution is made by the server upon receiving client-capability information from the client as part of software handshake process.

14. The method of claim 11, wherein determining whether the software service is capable of being executed by the client further comprises determining whether requirements conforming to service security and validation are met by the client.

15. The method of claim 1, wherein the service logic software code is executed by the client using a software plug-in.

16. The method of claim 1, wherein the service logic software code is executed by the client using a sandbox.

17. The method of claim 1 wherein the software service request is a web service request.

18. A system for processing one or more service requests for reducing service overhead in a service oriented architecture comprising one or more clients, one or more intermediate infrastructures, and one or more servers, the system comprising:

the one or more clients comprising:
an XML marshaller configured to receive a service request and further configured to convert request objects into XML-formatted data;
a Service Logic Binding component configured to encapsulate XML-formatted data within a SOAP message and further configured to define rules for binding the SOAP message to a service request message;
a Service Logic Invoker configured to send the service request message to a server, an intermediate infrastructure, and a client, based on determining whether the service can be executed at client-side;
a client container application configured to download service logic software code streamed from the server and further configured to execute the code in order to process the service request;
a Service Logic Response processor configured to process service response and deliver corresponding SOAP message to SOAP response interpreter;
a SOAP response interpreter configured to extract XML-formatted data from the SOAP message; and
an XML unmarshaller configured to extract service response object from XML-formatted data;
and the server configured to stream service logic software code to a client, the server comprising:
a service platform configured to host service logic software code corresponding to complete execution of service request, wherein the service logic software code is deployed at the service platform by a developer;
and
a service container application configured to host one or more portions of service logic software code that are client-compatible, wherein the client-compatible code corresponds to partial execution of the service request, further wherein the service container application is further configured: to determine portions of service logic software code that are client-compatible, to estimate the total system load including that of the client, to indicate a validity period of the service logic software code using a response header, and to execute the service logic code if the service logic code is in the validity period;

wherein the service request is processed by the client if it is determined that the service request is enabled for client-side execution or is capable of being executed by the client;

and wherein the service request is processed by the server if it is determined that the service request is not enabled for client-side execution or is not capable of being executed by the client;

and wherein the service request is processed by the intermediate infrastructure, wherein the intermediate infrastructure downloads the service logic software code from the server for processing the service request in lieu of the server to share the load on the server.

19. The system of claim 18, wherein the Service Logic Binding component is further configured to add custom headers to the service request message so that service logic software code is exchanged between the client container application and the server in a manner transparent to the client.

20. The system of claim 18, wherein the determination whether the service can be executed at the client system is made by the Service Logic Invoker based on establishing whether the service is enabled for client-side execution.

21. The system of claim 18, wherein the determination that service is capable for client-side execution is made by the Service Logic Invoker based on establishing whether the service logic software code is downloadable from the server.

22. The system of claim 18, wherein a developer demarcates the one or more portions of service logic software code that are client-compatible and deploys the one or more portions at the service container application.

23. The system of claim 18, wherein the service container application comprises an interface for streaming the one or more portions of service logic software code to the client.

24. The system of claim 18, wherein service logic software code corresponding to complete service implementation is deployed at the service container application, if it is determined that code corresponding to complete service implementation is client-compatible.

25. A computer program product comprising a non-transitory computer usable medium having a computer readable program code embodied therein for processing one or more service requests for reducing service overhead in a service oriented architecture comprising one or more clients, one or more intermediate infrastructures, and one or more servers, the computer program product comprising:

program instruction code for invoking a software service by a client, wherein the software service is invoked by sending a service request to a server hosting the software service;

program instruction code for receiving the service request by the server;

program instruction code for determining whether the software service is enabled for client-side execution and is capable of being processed by the client by estimating total system load including that of the client;

program instruction code for streaming service logic software code from the server to the client for enabling the client to process the service request upon ascertaining that the software service is enabled for client-side execution and is capable of being processed by the client, wherein the service logic software code is streamed to the client by a service container application and is downloaded by a client container application, and wherein the service container application is configured: to estimate the total system load including that of the client, to indicate a validity period of the service logic software code using a response header, and to execute the service logic code if the service logic code is in the validity period;

program instruction code for allowing processing of the software service by the client if the service logic software code is streamed from the server to the client;

program instruction code for allowing processing of the requested software service by the server, if it is determined that the software service is not enabled for client-side execution or is not capable of being executed by the client; and program instruction code for allowing processing of the requested software service by an intermediate infrastructure, wherein the intermediate infrastructure downloads the service logic software code from the at least one server for processing the requested software service in lieu of the server to share the load on the server.

26. The computer program product of claim 25 further comprising following the receipt of service logic software code, program instruction code for executing subsequent service requests for the software service by the client.

27. The computer program product of claim 26 further comprising program instruction code for receiving updates of the service logic software code at regular intervals by the client.

28. The computer program product of claim 25, wherein program instruction code for determining whether the software service is capable of being executed by the client comprises:

program instruction code for determining whether the client has the necessary resources and libraries for executing the service logic software code; and program instruction code for determining whether runtime execution of service logic software code is supported by the client.

29. The computer program product of claim 25, wherein program instruction code for determining whether the software service is capable of being executed by the client comprises program instruction code for determining whether requirements conforming to service security and validation are met by the client.

* * * * *